United States Patent
Morita

[11] Patent Number: 5,960,864
[45] Date of Patent: Oct. 5, 1999

[54] MULTI-TUBE HEAT EXCHANGER

[75] Inventor: Tomonari Morita, Azuma-mura, Japan

[73] Assignee: Sanden Corporation, Gunma, Japan

[21] Appl. No.: 08/842,776

[22] Filed: Apr. 17, 1997

[30] Foreign Application Priority Data

Apr. 17, 1996 [JP] Japan ..................................... 8-121086

[51] Int. Cl.$^6$ ..................................................... F28F 7/00
[52] U.S. Cl. ........................... 165/82; 165/178; 165/173; 165/DIG. 493; 228/183
[58] Field of Search ............. 165/82, 149, 173, 165/178; 228/183

[56] References Cited

U.S. PATENT DOCUMENTS

| | | | |
|---|---|---|---|
| 1,438,596 | 12/1922 | Harding | 165/173 X |
| 1,745,093 | 1/1930 | Heimberger | 165/82 |
| 1,796,945 | 3/1931 | Harter . | |
| 2,226,243 | 12/1940 | Herz | 228/183 X |
| 2,573,161 | 10/1951 | Tadewald | 165/178 X |
| 4,360,057 | 11/1982 | Koump | 165/82 |
| 5,004,045 | 4/1991 | Le Gauyer | 165/149 |
| 5,046,555 | 9/1991 | Nguyen . | |
| 5,101,887 | 4/1992 | Kado | 165/76 |

FOREIGN PATENT DOCUMENTS 1-181963  7/1989  Japan ..................................... 228/183

*Primary Examiner*—Allen Flanigan
*Attorney, Agent, or Firm*—Baker & Botts, L.L.P.

[57] ABSTRACT

A multi-tube heat exchanger includes a pair of tanks and a plurality of heat transfer tubes fluidly interconnected between the tanks, wherein each heat transfer tube has an engaging portion only at a first end portion engaging a wall of a first tank of the pair of tanks and a relatively movable portion at a second end portion capable of moving in an axial direction of the tube relative to a wall of the second tank. Such a structure helps ensure proper tube positioning and spacing while bowing or deformation of the heat transfer tubes is appropriately prevented at the time of heating and brazing.

7 Claims, 4 Drawing Sheets

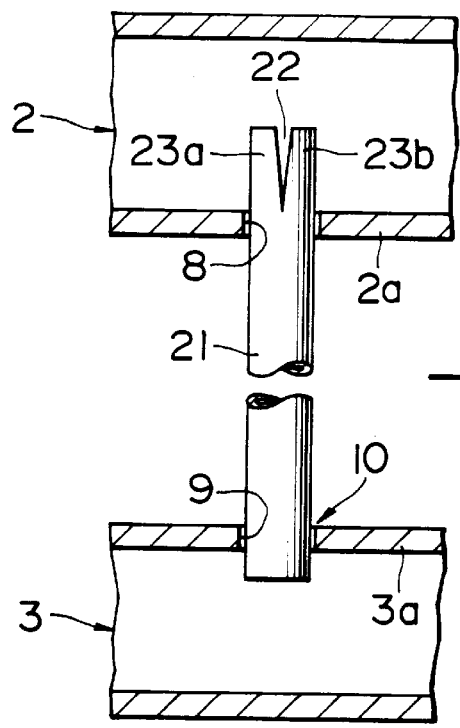
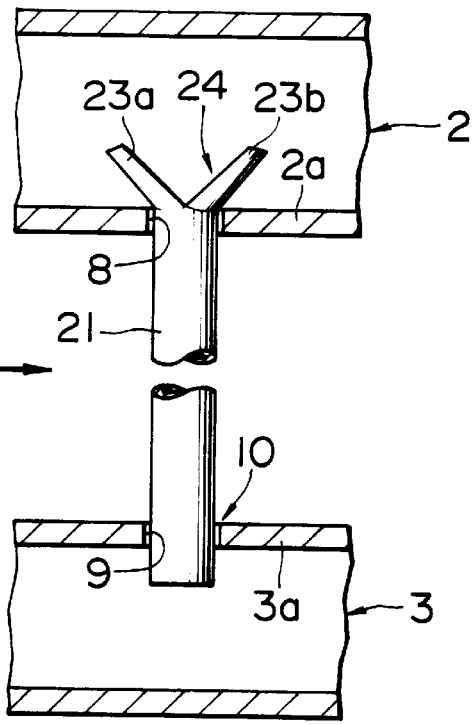
FIG. 4A    FIG. 4B
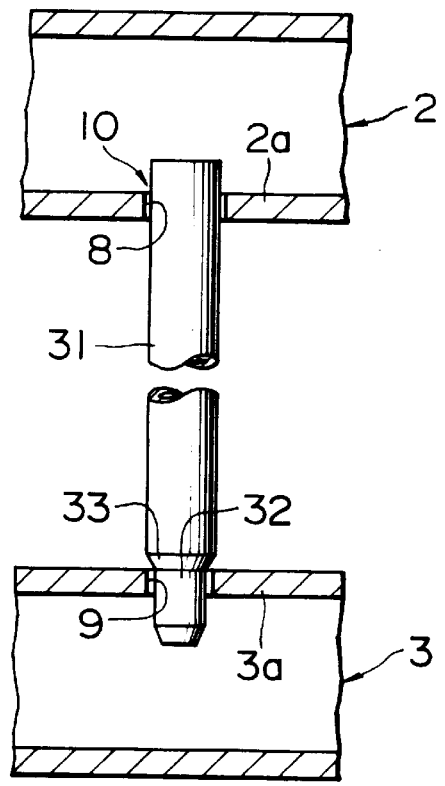
FIG. 5

MULTI-TUBE HEAT EXCHANGER

BACKGROUND OF THE INVENTION

1. Field of the Invention

The present invention relates to a multi-tube heat exchanger, and more particularly to an improved connection structure between tubes and a pair of tanks in the heat exchanger.

2. Description of the Related Art

In a conventional multi-tube heat exchanger having a pair of tanks spaced from each other and a plurality of heat transfer tubes fluidly interconnected between the tanks, usually, tube insertion holes are provided on walls of the respective tanks facing each other and the heat transfer tubes are brazed to the tanks at a condition where the end portions of the respective tubes are inserted into respective corresponding tube insertion holes.

In such a multi-tube heat exchanger, in order to facilitate the assembly, particularly, facilitate insertion of the heat transfer tubes into the tank holes in the assembly, and in order to ensure the positional accuracy between the tubes and the tanks, radially enlarged portions or radially contracted portions are provided on both end portions of the respective tubes, and the enlarged or contracted portions are engaged to the corresponding walls of the tanks.

For example, as shown in FIG. 6, radially contracted portions 102 are formed on both end portions of each heat transfer tube 101. At the time of assembly, the respective radially contracted portions 102 are inserted into respective corresponding tube insertion holes 103a and 104a defined on tank walls 103 and 104 of tanks 105 and 106 and engaged to the tank walls 103 and 104, respectively. In such a condition, in order to improve the brazing property of the engaging portions at the time of heating and brazing, tanks 105 and 106 are fixed from both sides using a jig 107, and each heat transfer tube 101 is brazed to tank walls 103 and 104 of the tanks 105 and 106 in a stationary condition.

However, when each heat transfer tube 101 is brazed to tank walls 103 and 104 under conditions where tanks 105 and 106 are fixed from both sides by jig 107, elongation of the heat transfer tube 101 at the time of heating and brazing is suppressed or restricted by the jig 107, because generally the coefficient of thermal expansion of the jig is lower than that of the parts forming the heat exchanger, particularly, that of the heat transfer tube 101. As a result, heat transfer tube 101 may bow or deform in any direction and a desired pitch or arrangement of a plurality of heat transfer tubes 101 is not maintained.

SUMMARY OF THE INVENTION

It is an object of the present invention to provide a multi-tube heat exchanger which can help ensure proper tube positioning and spacing and prevents bowing or deformation of heat transfer tubes due to heating and brazing.

The above and other objects may be achieved by a multi-tube heat exchanger according to the present invention. The multi-tube heat exchanger includes a pair of tanks spaced from each other and a plurality of heat transfer tubes fluidly interconnected between the pair of tanks. Each of the plurality of heat transfer tubes has an engaging portion at a first end portion of the tube which engages a wall of a first one of the pair of tanks. Each heat transfer tube has a relatively movable portion at the second end portion which enables movement in an axial direction of each heat transfer tube relative to the corresponding tank wall of a second one of the pair of tanks.

The engaging structure between the second end portion of each heat transfer tube and the corresponding tank wall of the second tank is not particularly restricted as long as the second end portion can move in the axial direction of the tube relative to the corresponding tank wall, particularly at the time of heating and brazing. For example, the second end portion of each heat transfer tube is connected to the tank wall of the second tank after being inserted into a tube insertion hole defined on the tank wall so that the second end portion is free to move in the axial direction relative to the tank wall.

Various structures may be employed as the engaging portion, as long as one end portion of each heat transfer tube can engage with a corresponding tank wall.

For example, the engaging portion may be formed as a ring-like flange portion protruding from a periphery of each heat transfer tube in a radially outer direction of the heat transfer tube. Further, the engaging portion may be formed as a radially expanded taper-tube portion. Furthermore, the engaging portion may be formed as a radially enlarged portion formed by providing at least two slits extending from the end of one end portion of each heat transfer tube in the axial direction and expanding portions positioned at both sides of the slits in a radially outer direction away from each other. Still further, the engaging portion may be formed as a radially contracted portion formed by partially contracting the diameter of one end portion of each heat transfer tube.

In such a multi-tube heat exchanger, only a first end portion of each heat transfer tube is engaged to a corresponding tank wall of a first tank of the pair of tanks before brazing, and the second end portion of the heat transfer tube is in a condition movable in the axial direction relative to a corresponding tank wall of the second tank. Therefore, the thermal expansion of the heat transfer tube or a difference between the amount of thermal expansion of the heat transfer tube and the amount of thermal expansion of a jig for fixing both tanks can be absorbed by the relatively movable structure between the second end portion of the heat transfer tube and the corresponding tank wall. As a result, the heat transfer tubes are positioned at a desired arrangement pitch and attitude with high accuracy by engaging a first end portion with the corresponding tank wall of a first tank, while bowing and deforming of the heat transfer tubes at heating and brazing are appropriately prevented by the relatively movable structure between the second end portion of the heat transfer tube and the corresponding tank wall.

Further objects, features, and advantages of the present invention will be understood from the following detailed description of the embodiments of the present invention with reference to the appropriate figures.

BRIEF DESCRIPTION OF THE DRAWINGS

Some embodiments of the invention will now be described with reference to the appropriate figures, which are given by way of example only, and are not intended to limit the present invention.

FIG. 4A is a partial, vertical sectional view of a heat exchanger according to a third embodiment of the present invention, and FIG. 4B is a partial, vertical sectional view of the heat exchanger depicted in FIG. 4A showing a condition after expanding end portions of a heat transfer tube.

FIG. 5 is a partial, vertical sectional view of a heat exchanger according to a fourth embodiment of the present invention.

DETAILED DESCRIPTION OF PREFERRED EMBODIMENTS

Figure 1:
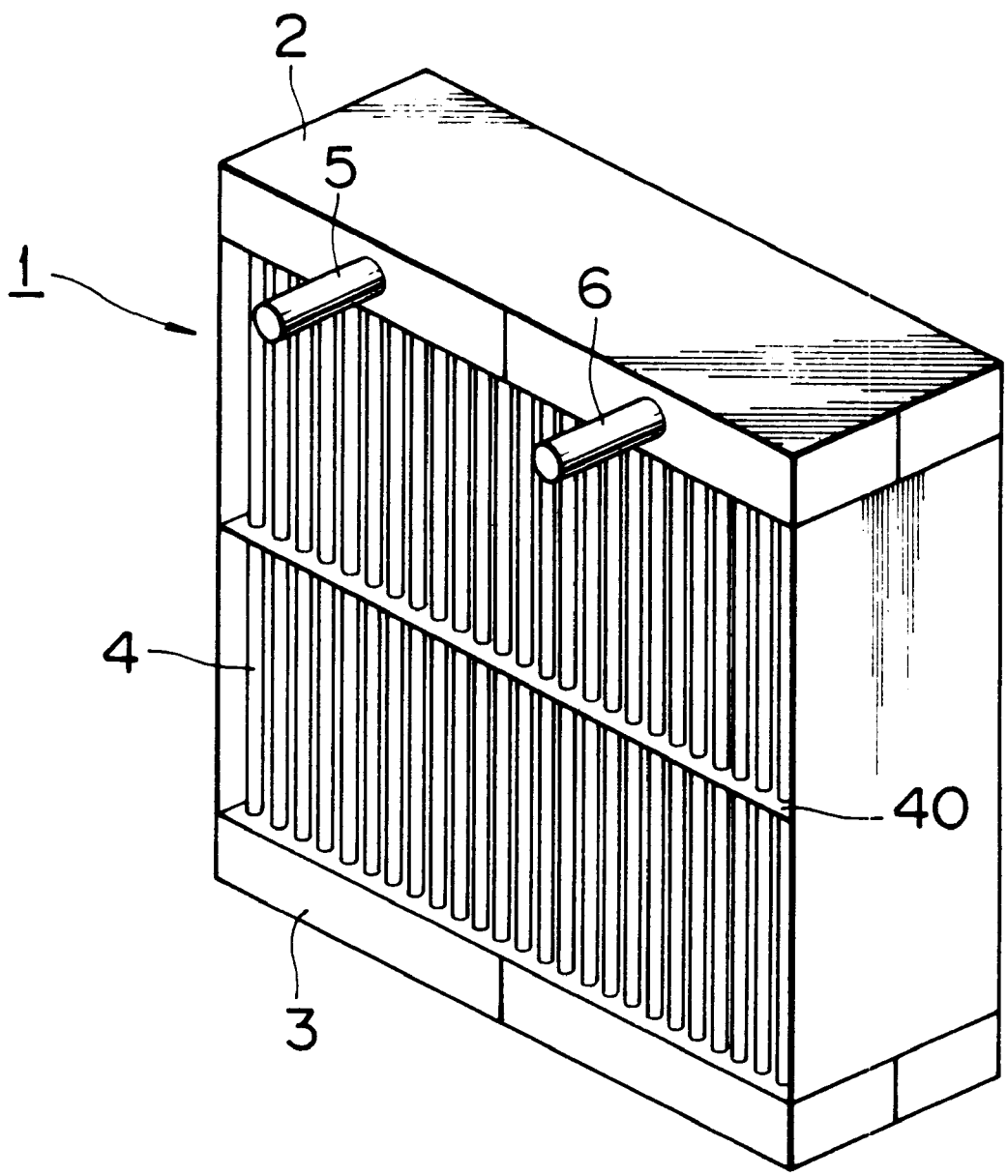
FIG. 1 is a perspective view of a multi-tube heat exchanger according to a first embodiment of the present invention.

Referring to FIGS. 1 and 2, a multi-tube heat exchanger 1 is provided according to a first embodiment. Heat exchanger 1 includes a pair of tanks 2 and 3, for example, an upper tank 2 and a lower tank 3. A plurality of heat transfer tubes 4 (for example, refrigerant tubes having a circular cross section) are fluidly interconnected between tanks 2 and 3. In this embodiment, at least heat transfer tubes 4 are made from an aluminum alloy. Inlet pipe 5 and outlet pipe 6 are connected to tank 2. In this embodiment, although a supporting plate 40 is provided at a position corresponding to a middle portion of each heat transfer tube 4 in the axial direction in order to support the tubes 4, this supporting plate 40 may not be provided. Heat exchange medium, for example, refrigerant, is introduced into tank 2 through inlet pipe 5, and after circulation through heat exchanger 1, the heat exchange medium flows out of tank 2 through outlet pipe 6.

Figure 2A:
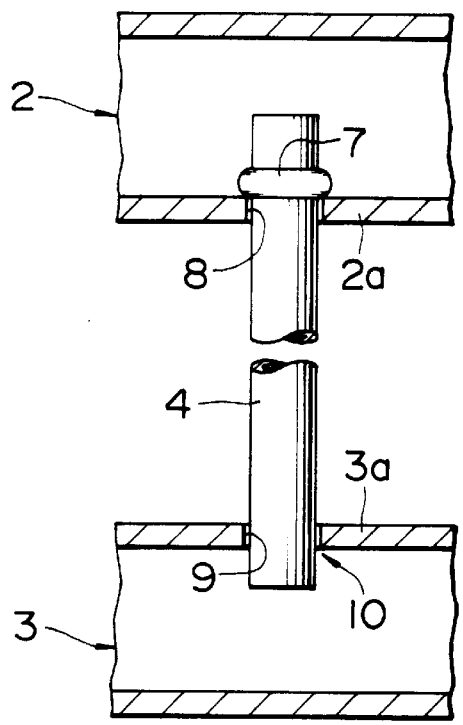
FIG. 2A is an enlarged, partial, vertical sectional view of the heat exchanger depicted in FIG. 1.

As depicted in FIG. 2A, at one end portion, each heat transfer tube 4 has a flange portion 7 provided as an engaging portion capable of engaging a corresponding tank wall 2a of tank 2. Flange portion 7 is formed as a ring-like portion protruding from a periphery of heat transfer tube 4 in a radially outer direction of the tube 4. This flange portion 7 engages with the upper surface of tank wall 2a (the inner surface of the tank wall 2a of tank 2) after heat transfer tube 4 is inserted into a tube insertion hole 8 defined on the tank wall 2a from the upper side of the figure. Tank 2 is divided in two tank members (not shown) so as to be able to insert the tube 4 into the tube insertion hole 8 from the upper side.

The other end portion of heat transfer tube 4 is formed as it is, that is, as a straight tubular form. The other end portion of heat transfer tube 4 is inserted into a tube insertion hole 9 defined on a corresponding tank wall 3a of tank 3. This portion of heat transfer tube 4 is free to move in the axial direction relative to tank wall 3a, and this portion constitutes relatively movable portion 10.

Figure 2B:
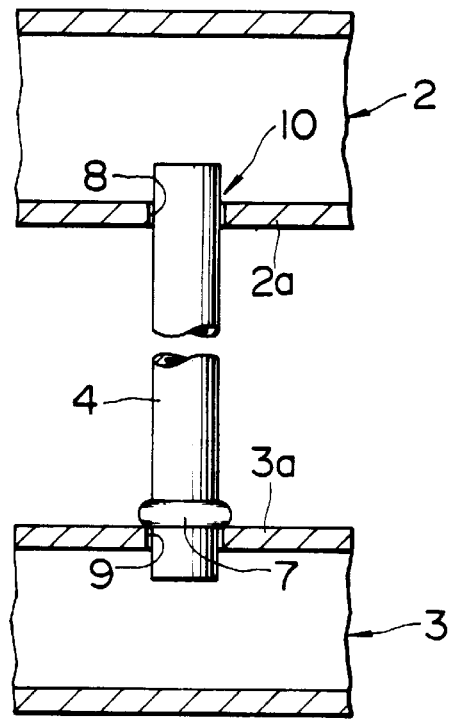
FIG. 2B is a partial, vertical sectional view of a heat exchanger according to a modification of the heat exchanger depicted in FIG. 2A.

As depicted in FIG. 2B, flange portion 7 may be provided at the side of tank wall 3a of tank 3. In this case, flange portion 7 engages with the upper surface of tank wall 3a (the outer surface of tank 3), and relatively movable portion 10 movable in the axial direction, is defined between the upper end straight portion of heat transfer tube 4 and tube insertion hole 8 defined on tank wall 2a of tank 2.

Figure 6:
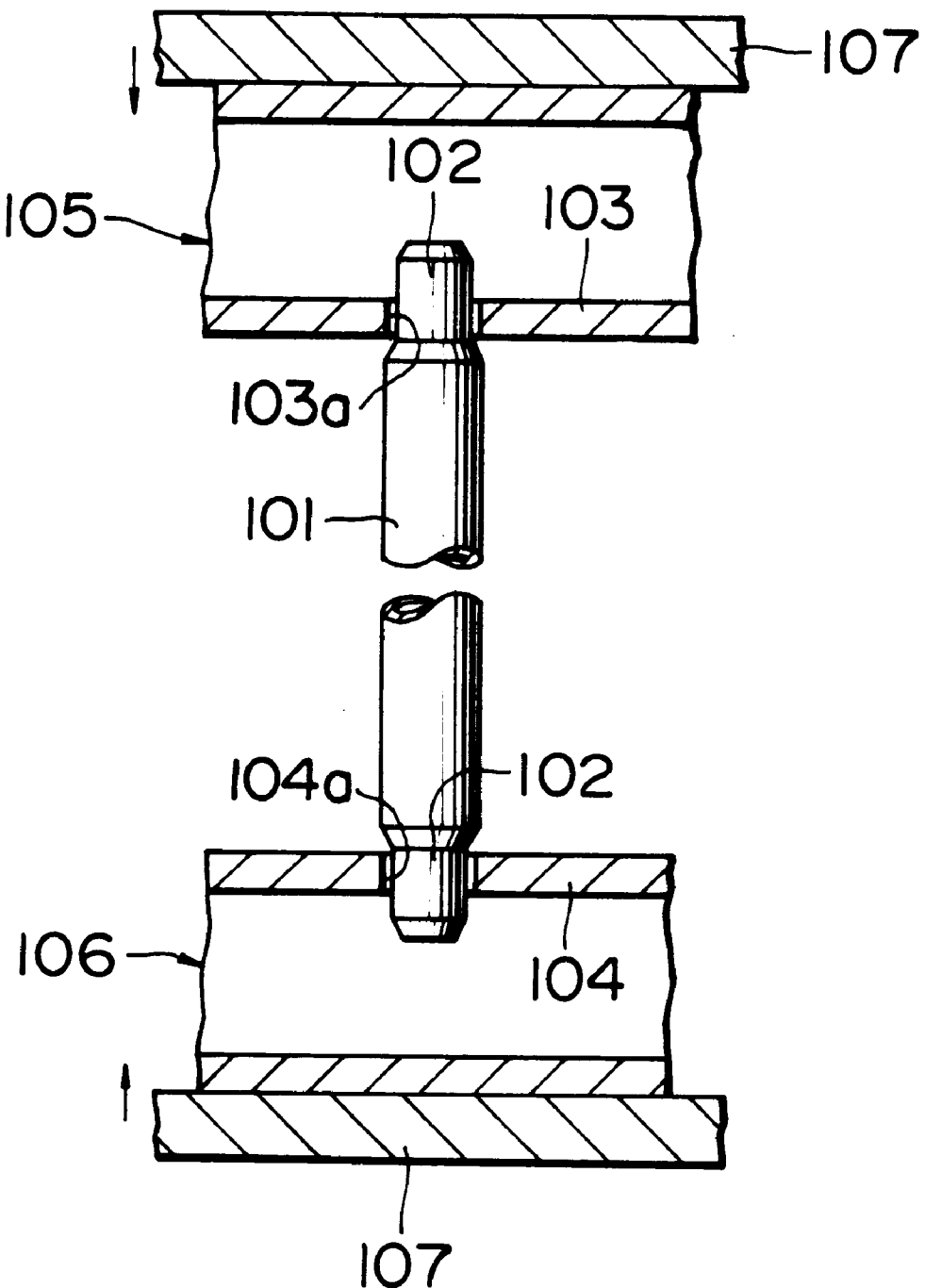
FIG. 6 is a partial, vertical sectional view of a conventional heat exchanger.

In such a multi-tube heat exchanger 1 thus constructed, at the time of assembly before heating and brazing, only a first end portion of heat transfer tube 4, that is, only flange portion 7, is engaged in the axial direction with tank wall 2a (or 3a), and the second end portion of the tube 4 can freely move in the axial direction relative to tank wall 3a (or 2a). Therefore, the assembled heat transfer tubes 4 are disposed at a required position, a required arrangement pitch and a required attitude with high accuracy. After such an assembly, heat transfer tubes 4 and both tanks 2 and 3 are heated and brazed. In the heating and brazing, the thermal expansion of each heat transfer tube 4 or a difference between the amount of the thermal expansion of each heat transfer tube 4 and the amount of the thermal expansion of a jig (not shown, refer to FIG. 6) for fixing tanks 2 and 3 is absorbed by the relatively movable structure between the second end portion of tube 4 and a corresponding tank wall 3a (or 2a). As a result, bowing or deformation of each heat transfer tube 4 is appropriately prevented.

Figure 3A:
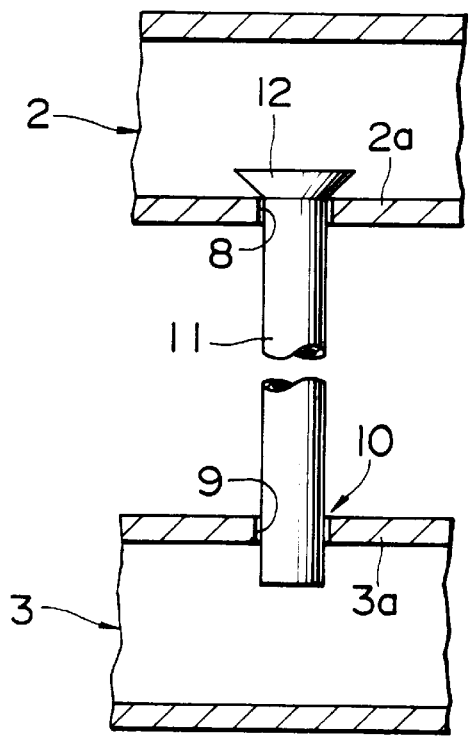
FIG. 3A is a partial, vertical sectional view of a heat exchanger according to a second embodiment of the present invention.

FIG. 3 shows a structure of a multi-tube heat exchanger according to a second embodiment of the present invention. In this embodiment, as depicted in FIG. 3A, a radially expanded taper-tube portion 12 is provided at a first end portion of each heat transfer tube 11 as an engaging portion according to the present invention. The second end portion of heat transfer tube 11 is formed as a straight tube portion similarly to that shown in FIG. 2a. Heat transfer tube 11 is inserted into tube insertion hole 8 defined on tank wall 2a from the upper side of the figure, and radially expanded taper-tube portion 12 engages with the tank wall 2a. The second end portion of heat transfer tube 11 is inserted into tube insertion hole 9 on tank wall 3a, and the portion therebetween defines a relatively movable portion 10 movable in the axial direction.

In such a structure, substantially the same advantages as those in the first embodiment shown in FIG. 2a are obtained.

Figure 3B:
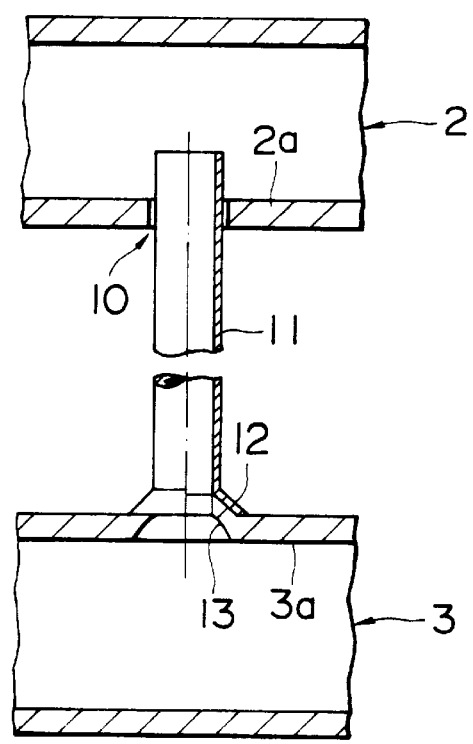
FIG. 3B is a partial, vertical sectional view of a heat exchanger according to a modification of the heat exchanger depicted in FIG. 3A.

The above-described radially expanded taper-tube portion 12 may be formed at the side of tank wall 3a of tank 3, as depicted in FIG. 3B. In this case, it is preferred that a burr 13 is formed on tank wall 3a toward the upper direction of the figure (toward an outer direction of tank 3) and radially expanded taper-tube portion 12 is engaged with the burr 13 by covering the burr 13 with the radially expanded taper-tube portion 12, thereby positioning heat transfer tube 11 at a higher accuracy.

In such a structure, substantially the same advantages as those in the first embodiment shown in FIG. 2b are obtained.

FIG. 4 shows a structure of a multi-tube heat exchanger according to a third embodiment of the present invention. In this embodiment, as depicted in FIG. 4A, at least two slits 22 are provided on one end portion of each heat transfer tube 21 so that each slit 22 extends from the tube end in the axial direction of the tube 21. Then, as depicted in FIGS. 4A and 4B, portions 23a and 23b positioned at both sides of slits 22 are expanded in a radially outer direction so that the portions 23a and 23b are separated from each other to form a radially enlarged portion 24. This radially enlarged portion 24 thus formed constitutes an engaging portion according to the present invention. The other end portion of heat transfer tube 21 is formed as substantially the same structure as that depicted in FIG. 2a.

In such a structure, substantially the same advantages as those in the first embodiment shown in FIG. 2a are obtained. Where, portions 23a and 23b positioned at both sides of slits 22 may be expanded prior to the insertion of heat transfer tube 21.

FIG. 5 shows a structure of a multi-tube heat exchanger according to a fourth embodiment of the present invention. In this embodiment, a first end portion of each heat transfer tube 31 is formed as a radially contracted portion 32. A stepped portion 33 relative to the center portion of tube 31 is formed by the formation of the radially contracted portion 32. In such a structure, radially contracted portion 32 is inserted into tube insertion hole 9 of tank wall 3a of tank 3 and stepped portion 33 engages the tank wall 3a. On the other hand, the second end portion of tube 31 is formed as a straight tube portion and inserted into tube insertion hole of tank wall 2a of tank 2 and can freely move in the axial direction relative to the tank wall 2a. Therefore, in this structure, substantially the same advantages as those in the first embodiment shown in FIG. 2b are obtained.

Although multi-tube heat exchangers arranged with tanks 2 and 3 in a vertical direction have been explained in the above-described embodiments, the arrangement direction of tanks may be in a horizontal or other directions.

Although several embodiments of the present invention have been described in detail herein, the scope of the invention is not limited thereto. It will be appreciated by those skilled in the art that various modifications may be made without departing from the scope of the invention. Accordingly, the embodiments disclosed herein are only exemplary. It is to be understood that the scope of the invention is not to be limited thereby, but is to be determined by the claims which follow.

What is claimed is:

1. A multi-tube heat exchanger assembled by brazing, comprising:

a pair of tanks spaced from each other;

a plurality of heat transfer tubes, fluidly interconnected between said pair of tanks, each of said plurality of heat transfer tubes having a first end portion and a second end portion and defining a longitudinal axis;

said first end portion comprising an engaging portion operative to engage said first end portion with a first tank of said pair of tanks at a fixed insertion depth;

said second end portion configured to permit relative motion in either direction along said longitudinal axis between said second end portion and a second tank of said pair of tanks when there is no solidification of any braze compound present between said second end portion and a wall of the second tank of said pair of tanks and when said pair of tanks are maintained in a fixed spatial relationship.

2. The multi-tube heat exchanger of claim 1, wherein the second end portion of each of said plurality of heat transfer tubes is connected to said wall of the second tank after being inserted into a tube insertion hole defined on said wall of the second tank, said second end portion being free to move in said axial direction relative to said wall of the second tank.

3. The multi-tube heat exchanger of claim 1, wherein said plurality of heat transfer tubes are made from an aluminum alloy.

4. The multi-tube heat exchanger of claim 1 or 2, wherein said engaging portion is formed as a ring-like flange portion protruding in a radially outward direction from a periphery of each of said plurality of heat transfer tubes.

5. The multi-tube heat exchanger of claim 1 or 2 wherein said engaging portion is formed as a radially expanded taper-tube portion.

6. The multi-tube heat exchanger of claim 1 or 2 wherein said engaging portion is formed as a radially enlarged portion formed by providing at least two slits extending axially from the first end of each of said plurality of heat transfer tubes and expanding portions adjacent to said slits in a radially outer direction away from each other.

7. The multi-tube heat exchanger of claim 1 or 2, wherein said engaging portion is formed as a radially contracted portion formed by partially contracting the diameter of said first end portion of each of said plurality of heat transfer tubes.

* * * * *